United States Patent [19]
Yasuda et al.

[11] Patent Number: 4,907,154
[45] Date of Patent: Mar. 6, 1990

[54] VIBRATION CONTROL APPARATUS

[75] Inventors: Eiichi Yasuda, Seto; Shunichi Doi, Nagoya; Yasutaka Hayashi, Seto, all of Japan

[73] Assignee: Kabushiki Kaisha Toyota Chuo Kenkyusho, Aichi, Japan

[21] Appl. No.: 113,741

[22] Filed: Oct. 27, 1987

[30] Foreign Application Priority Data

Oct. 31, 1986 [JP] Japan .................. 61-261342

[51] Int. Cl.$^4$ .............................. B60G 13/08
[52] U.S. Cl. ................. 364/424.05; 280/707
[58] Field of Search .......... 364/424.05; 280/6 R, 280/6 H, 707, 689, DIG. 1

[56] References Cited

U.S. PATENT DOCUMENTS

| | | | |
|---|---|---|---|
| 4,579,366 | 4/1986 | Doi et al. | 280/707 |
| 4,671,533 | 6/1987 | Asami et al. | 280/DIG. 1 |
| 4,673,194 | 6/1987 | Sugasawa | 364/424.05 |
| 4,712,807 | 12/1987 | Kurosawa | 364/424.05 |
| 4,770,438 | 9/1988 | Sugasawa et al. | 280/707 |

Primary Examiner—Gary Chin
Attorney, Agent, or Firm—Roberts, Spiecens & Cohen

[57] ABSTRACT

In a vibration control apparatus, a physical value influencing characteristics of a suspension for supporting a vibrating body and a state value representing movement of the suspension are detected. A frequency distribution of these values with respect to levels is calculated every predetermined period of time. A target control force is calculated on the basis of the frequency distribution in consideration of a continuous change in external state. An actual control force (detection control force) is calculated by the detected physical value. The suspension characteristics are continuously, variably controlled so as to equivalently generate a control force corresponding to a difference between the target and detection control forces. As a result, the target control force is equivalently applied to the suspension, thereby damping the vibrations. The vibration control apparatus can generate an optimal target control force free from the influence of an external state change on the basis of the frequency distribution of the state and physical values of the suspension.

8 Claims, 11 Drawing Sheets

SH.1/2

SH.2/2

VIBRATION CONTROL APPARATUS

FIELD OF THE INVENTION

The present invention relates to a vibration control apparatus in a support for a building or a moving vehicle when the building or the moving vehicle is vibrated by an external force or disturbance (a road surface).

RELATED PRIOR ART

Conventional vibration control apparatuses include: an active control apparatus for forcibly applying high energy against an external force or disturbance by using the pressure of an external hydraulic source outside a suspension to control the vibrations; a semiactive control apparatus for detecting a vibration state and selecting an optimal one of a few of the preset damping characteristics on the basis of a vibration state output to change the damping force characteristics by using low energy, thereby controlling the vibrations; and a partial active control apparatus for applying part of the energy fom an external hydraulic source outside a suspension as needed to control sprung mass.

However, these conventional vibration control apparatuses have the following disadvantages. In a conventional active control apparatus, the pressure of the hydraulic source must always be utilized to control a control force acting on the suspension. Energy consumed by the hydraulic source is high, and the number of components such as a pump, a tank, and an accumulator is increased to result in a bulky and expensive control apparatus. In a conventional semiactive control apparatus, discrete control is required. Although the vibrations can be damped, an optimal target control force obtained in consideration of various external forces and disturbance cannot be generated, so that an optimal damping force characteristic control force cannot be applied to the suspension. Therefore, the vibrations cannot be sufficiently damped. In a conventional partial active control apparatus, the target control force is only partially applied from an external pressure source, and satisfactory vibration control cannot be performed. In addition, this apparatus is subjected to discrete control and cannot cope with small vibrations with a high frequency.

The main disadvantage of the conventional vibration control apparatuses is caused by discrete control of an object of interest as some of the all control forces instead of controlling all control forces for controlling vibrations in the apparatuses using semiactive and partial active control. As a result, perfect control cannot be achieved. In the apparatus using active control, the control force required for controlling the vibration can be directly controlled. However, a high power is always required, thus resulting in a bulky apparatus.

A vibration control apparatus which solved the above-mentioned conventional problems was proposed by the present inventors, as filed as European Patent Application No. 86 115 401.1. As shown in FIG. 2, this vibration control apparatus comprises a state detecting means I for detecting a physical value influencing characteristics of a suspension for supporting a vibrating body and for detecting a state value representing motion of the suspension, a control means II for calculating a difference between a target control force and a detection control force in consideration of the physical and/or state value, a driving means III for amplifying the power of a difference signal as an output from the control means II, and an actuator means IV for variably continuously controlling suspension characteristics so as to equivalently generate a control force, corresponding to the difference between the target and detection control forces in consideration of the external force or disturbance acting on the suspension, on the basis of an amplified output from the driving means III, the control means II being provided with: a target control force calculating means $II_1$ comprising a state discriminating means $II_{11}$ for discriminating a mass, a spring constant, a damping coefficient, or a state of an external force or disturbance as needed on the basis of an output from the state detecting means I, a gain selecting means $II_{12}$ for selecting an optimal one of prestored gains for various ones of state signals which are used for vibration control and generated by the state detecting means I, on the basis of an output from the state discriminating means $II_{11}$, and an optimal target control force calculating means $II_{13}$ for multiplying the selected gains with the state signals used for the vibration control and adding resultant products; a detection control force calculating means $II_2$ for calculating a detection control force corresponding to the physical value detected by the state detecting means I, and a difference calculating means $II_3$ for calculating the difference between the target and detection control forces, wherein the suspension characteristics can be continuously variably controlled so as to generate the control force corresponding to the difference between the target and detection control forces in consideration of the external force or disturbance acting on the suspension, whereby preventing vibrations by equivalently acting the target control force on the suspension.

The vibration control apparatus quickly responds to the external force or disturbance and continuously controls the suspension characteristics required for vibration control for equivalently obtaining an optimal target control force corresponding to the input state. At the same time, the apparatus has a simple arrangement, and weight, space, and cost of the power source and piping can be reduced.

In this vibration control apparatus, the internal state of the vibrating body or suspension, such as the mass, the spring constant, and the damping coefficient of the vibrating body is detected. However, a change in external state cannot be detected. Since the target control force is applied by setting an optimal gain corresponding to the internal state, the apparatus can sufficiently cope with changes in internal state. However, when changes in external state, such as an external force or disturbance acting on the suspension (e.g., a pulsed abrupt vibration caused by a bump corresponding to a rough road is applied to the suspension on a smooth road), occur, an optimal target control force corresponding to the road state cannot be calculated. For this reason, a passenger in a vehicle feels discomfort, and driving stability cannot be satisfactory. Furthermore, conventional external state discrimination checks if the magnitude of the external state exceeds a preset value. Therefore, even if a pulsed sudden external force or disturbance exceeds the preset value, a change in state is discriminated. In this manner, changes in external state cannot be continuously detected.

SUMMARY OF THE INVENTION

It is an object of the present invention to provide a vibration control apparatus wherein a change in external state can be continuously accurately detected to apply an optimal control force to a moving body, thereby improving riding comfort and driving stability.

In order to control the continuous change in external state, the influence of a pulsed abrupt change in external state must be eliminated from an external force or disturbance included in a time-serial external state detection signal. However, in order to eliminate the influence of the pulsed abrupt change in external state, the external state detection signal can be filtered by a low-pass filter. However, since all external state detection signals having a frequency higher than a cutoff frequency of the low-pass filter are continuously filtered, an external force or disturbance having a frequency higher than the cutoff frequency is also eliminated. Therefore, an output signal filtered through the low-pass filter does not accurately represent the external state.

The present inventors paid attention not to the frequency in Hz of the external force or disturbance but to the frequency of occurrence. Preset levels are accumulated within a predetermined period of time, and a frequency distribution of the levels within the predetermined period of time is calculated. Even if a pulsed external force or disturbance is included in the frequency distribution, the frequency of occurrence is small within the corresponding level width. In this case, the distribution has a steep peak near the zero level. However, if a large external force or disturbance is frequently applied, the frequencies of occurrence of the respective preset levels are large, and the distribution curve is moderate. In this manner, the continuous change in external state is discriminated according to the frequency distribution, thereby calculating an optimal target control force.

A vibration control apparatus according to the present invention comprises: a state detecting means I for detecting a physical value influencing characteristics of a suspension for supporting a vibrating body and for detecting a state value representing motion of the suspension; a control means II comprising a target control force calculating means $II_1$ for calculating an optimal target control force in consideration of an external force or disturbance acting on the suspension, on the basis of the physical and state values output from the state detecting means I, a detection control force calculating means $II_2$ for calculating a detection control force corresponding to the physical value detected by the state detecting means I, and a deviation calculating means $II_3$ for calculating a deviation of the detection control force from the target control force; a driving means III for amplifying a power of a deviation signal representing the deviation of the detection control force from the target control force and generated by the control means II; and an actuator means IV for continuously variably controlling the suspension characteristics for equivalently generating a control force, corresponding to the deviation of the detection control force from the target control force in consideration of the external force or disturbance acting on the suspension, on the basis of the power-amplified output, the target control force calculating means $II_1$ in the control means II comprising a state frequency distribution calculating means $II_{11}$ for counting the frequency of occurrence obtained by counting passing (or "crossing") of an external state signal input as the state or physical value from the state detecting means I through a plurality of levels within a predetermined period of time in units of preset levels to calculate a frequency distribution of the levels every predetermined period of time and for discriminating a continuous external state from the frequency distribution, a gain selecting means $II_{12}$ for selecting an optimal one of the gains prestored on the basis of an output from the state frequency distribution calculating means $II_{11}$, and an optimal target control force calculating means $II_{13}$ for multiplying the gains selected by the gain selecting means with the state and/or physical value signal as an output from the state detecting means I and for adding products, wherein the frequency distribution of the state or physical value is calculated by the state frequency distribution calculating means $II_{11}$ to accurately discriminate the continuous change in external state, and the optimal control force is calculated on the basis of the gain, so that an optimal target control force free from the influence of a pulsed external force or disturbance component is generated, whereby optimally, continuously, variably controlling the suspension characteristics.

The operations and effects of the present invention having the above constitution are given as follows. The external state signal input as the state or physical value input from the state detecting means is calculated by the state frequency distribution calculating means to obtain a frequency distribution of levels within a predetermined period of time so as to accurately detect the continuous change in external state. Assume that the state signals representing external state information of the external force or disturbance acting on the suspension are input, e.g., a state signal A representing a pulsed external force shown in FIG. 3 and a state signal representing that an external force frequently acts on the suspension are input to the state frequency distribution calculating means $II_{11}$. When the state signal A is input, the frequency of occurrence of the pulsed state signal is 2 within the range of the preset levels $+L6$ to $-L3$. Other signal components most frequently pass through the preset level L0. Therefore, the resultant distribution curve has a peak at L0. When the state signal B is input, the distribution curve has a peak at L0. However, the frequency of occurrence is smaller than that of the peak in the state signal A. Instead, the frequency of occurrence within the range of $+L4$ to $-L4$ is large. In this manner, the frequency distribution within every predetermined period of time is calculated, and the continuous change in external state can be accurately discriminated. The gain selecting means can select an optimal gain corresponding to the discrimination result. The optimal target control force calculating means can calculate an optimal target control force by using the selected gain. Therefore, the optimal target control force free from the influence of the component such as a pulsed external force or disturbance can be generated. This control force output is amplified by the driving means, and an output from the driving means drives the actuator means attached to the suspension, thereby continuously, optimally, variably controlling the suspension characteristics.

In the vibration control apparatus according to the present invention, the frequency distribution of the state or physical value of the suspension is calculated by the target control force calculating means, and therefore, the influence of the pulsed external force or disturbance, or of noise can be effectively prevented while the continuous change in external state is kept preserved. Frequent switching of the target control force which is caused by the pulsed external force or disturbance or noise can be eliminated. Therefore, shock accompanied by frequent switching of the target control force can be reduced. At the same time, vibrations acting on the vibrating body can be stably controlled.

First Aspect

FIG. 4 is a block diagram showing a first aspect of the present invention. The state frequency distribution calculating means $II_{11}$ comprises a frequency distribution calculating means $II_{111}$ for accumulating the frequency of occurrence obtained by counting passing of the external state signal input as the state or physical value from the state detecting means I through the preset levels within a predetermined period of time and for calculating a frequency distribution of the levels within the predetermined period of time, and a standard deviation calculating means $II_{112}$ for calculating a standard deviation, the standard deviation calculating means $II_{112}$ being provided with a means for calculating an average level width of the frequency distribution and a means for comparing a deviation of the average level width of the frequency distribution with a preset value, wherein the standard deviation calculating means $II_{112}$ eliminates the pulsed external force or disturbance, thereby accurately detecting a continuous change in external state.

The operation and effect of the first aspect having the above arrangement will be described below.

The frequency distribution calculating means $II_{111}$ calculates a frequency distribution, within every predetermined period of time, of the external state signal input as a state or physical value X or Z from the state detecting means I. A standard deviation value is calculated by the standard deviation calculating means $II_{112}$ on the basis of the calculated frequency distribution. The calculated value is compared with the preset value. If the calculated value is smaller than the preset value, the external force or disturbance continuously acting on the suspension is small. However, if the calculated value is larger than the preset value, the external force or disturbance acting on the suspension is detected as a large force. By calculating the standard deviation value, the continuous external force or disturbance can be calculated as a statistical average value. Therefore, the continuous change in external state can be accurately detected.

Second Aspect

FIG. 5 is a block diagram showing a second aspect of the present invention. The state frequency distribution calculating means $II_{11}$ comprises a frequency distribution calculating means $II_{111}$ for accumulating the frequency of occurrnce obtained by counting passing of the state or physical value signal from the state detecting means I through the levels within every predetermined period of time and for calculating a frequency distribution, a cumulative frequency distribution calculating means $II_{113}$ for accumulating the frequency distribution obtained for a given period of time ahead of the current time, the given period of time being required to allow learning of the change in external state, and a standard deviation calculating means for calculating an average level width of the cumulative frequency distribution and comparing a deviation of the average level width with a preset value.

The operations and effects of the second aspect having the above arrangement will be described below.

The frequency distribution obtained by the frequency distribution calculating means $II_{111}$ within every predetermined period of time is stored in a memory arranged in the cumulative frequency distribution calculating means $II_{113}$. The frequency distribution obtained for a given period of time ahead of the current time so as to allow learning of the changes in external state is accumulated in units of levels to calculate the cumulative frequency distribution. The standard deviation is calculated on the basis of the cumulative frequency distribution. Therefore, the continuous change in external state such as an external force or disturbance acting on the suspension can be discriminated within every predetermined period of time.

In the vibration control apparatus according to the second aspect, the frequency distribution calculating means $II_{11}$ can accumulate a required number of previous frequency distributions obtained by the frequency distribution calculating means $II_{11}$ and can calculate the cumulative frequency distribution. The standard deviation is calculated on the basis of the cumulative frequency distribution, and the continuous change in external state such as an external force acting on the suspension can be detected. Therefore, an optimal target control force including previous external state changes can be calculated. Therefore, vibration damping characteristics of the vibrating body can be greatly improved. In addition, the frequency distributions calculated within every predetermined period are accumulated, and the time required for calculating the frequency distributions for detecting an identical external state change can be reduced to a few fractions of the required time. In this manner, the repetition time required for discriminating the external state can be shortened. Even if the external force or disturbance acting on the suspension continues for a relatively short period of time, the continuous change in external state can be accurately detected, and the corresponding optimal target control force can be calculated, thereby further improving the effect of the first aspect.

BRIEF DESCRIPTION OF THE DRAWINGS

FIGS. 6 to 8 show the first embodiment of the present invention, in which FIG. 7 is a diagram showing the entire system, and FIG. 8 is a block diagram of an operation unit thereof; and FIGS. 9 to 11 show the second embodiment of the present invention, in which FIG. 9 is a diagram showing the entire system, FIG. 10 is a flow chart for explaining the operations of a state frequency distribution calculating means $II_{11}$ and a gain selecting means $II_{12}$, and FIG. 11 is a view for explaining a calculation of a cumulative frequency distribution.

DETAILED DESCRIPTION OF THE PREFERRED EMBODIMENTS

First Embodiment

A vibration control apparatus according to a first embodiment is arranged such that the first aspect of the present invention is applied to a hydropneumatic suspension apparatus for a motor vehicle in which an orifice 130 is formed midway along a hydraulic path or a pipe 150 for connecting a hydraulic cylinder 110 and an accumulater 120. In the first embodiment, a vehicle wheel suspension is exemplified with reference to FIGS. 6(a) to 8.

Figure 1:
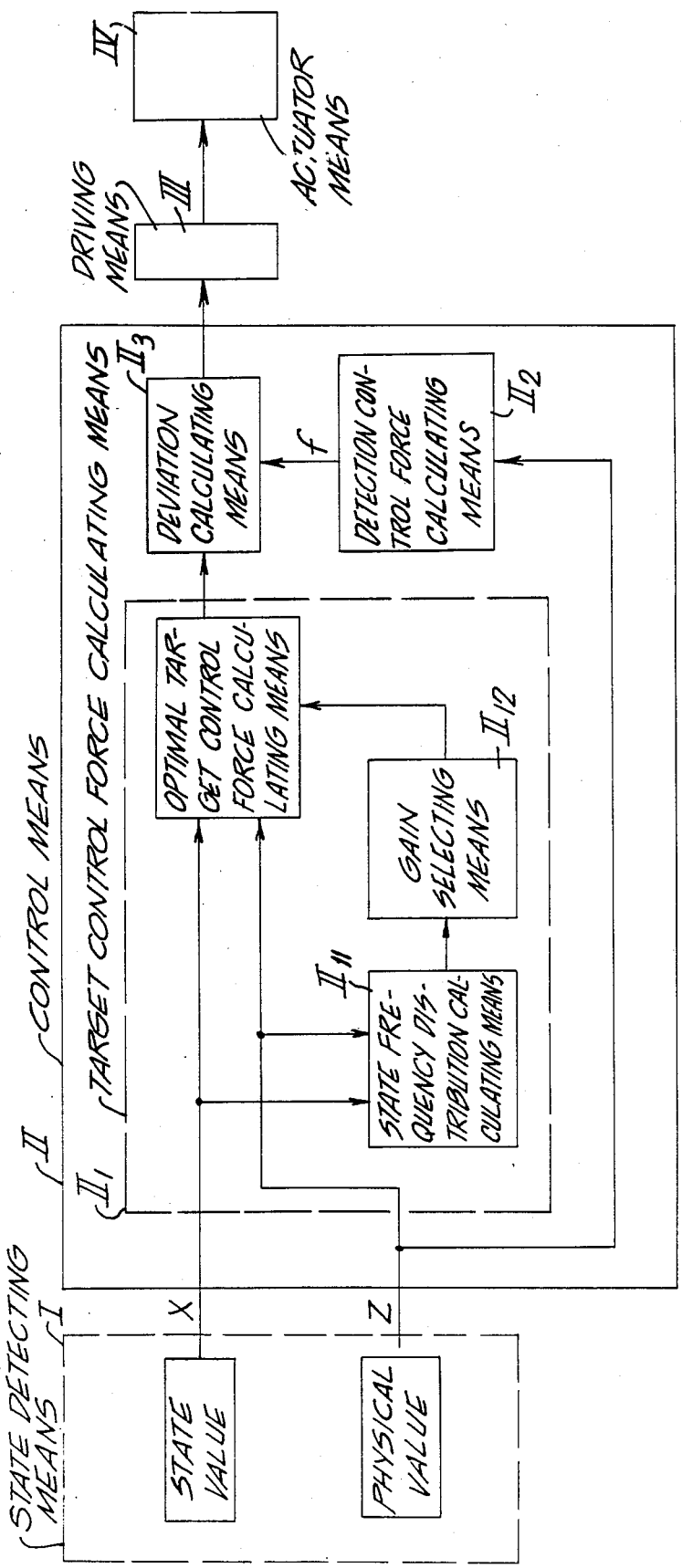
FIG. 1 is a schematic block diagram showing the principle of the present invention.
Figure 2:
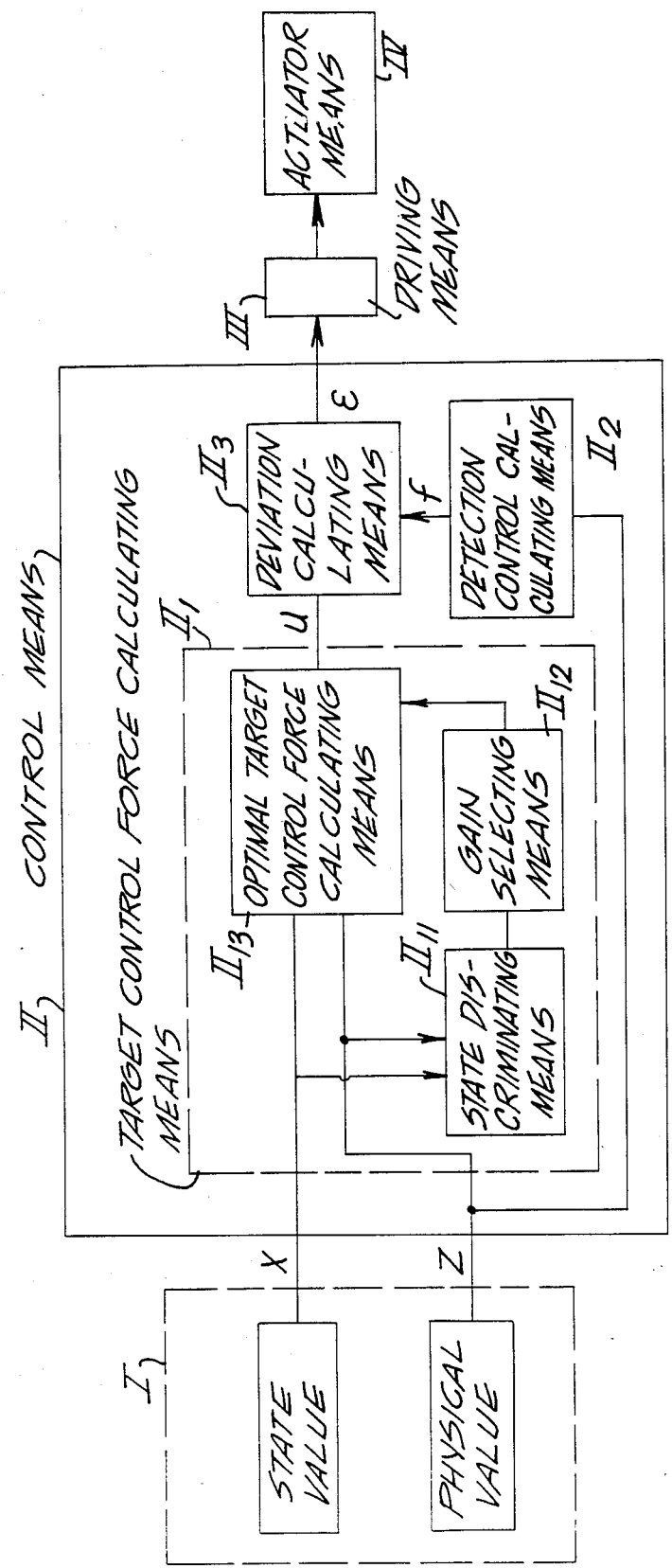
FIG. 2 is a schematic block diagram showing a conventional principle.
Figure 4:
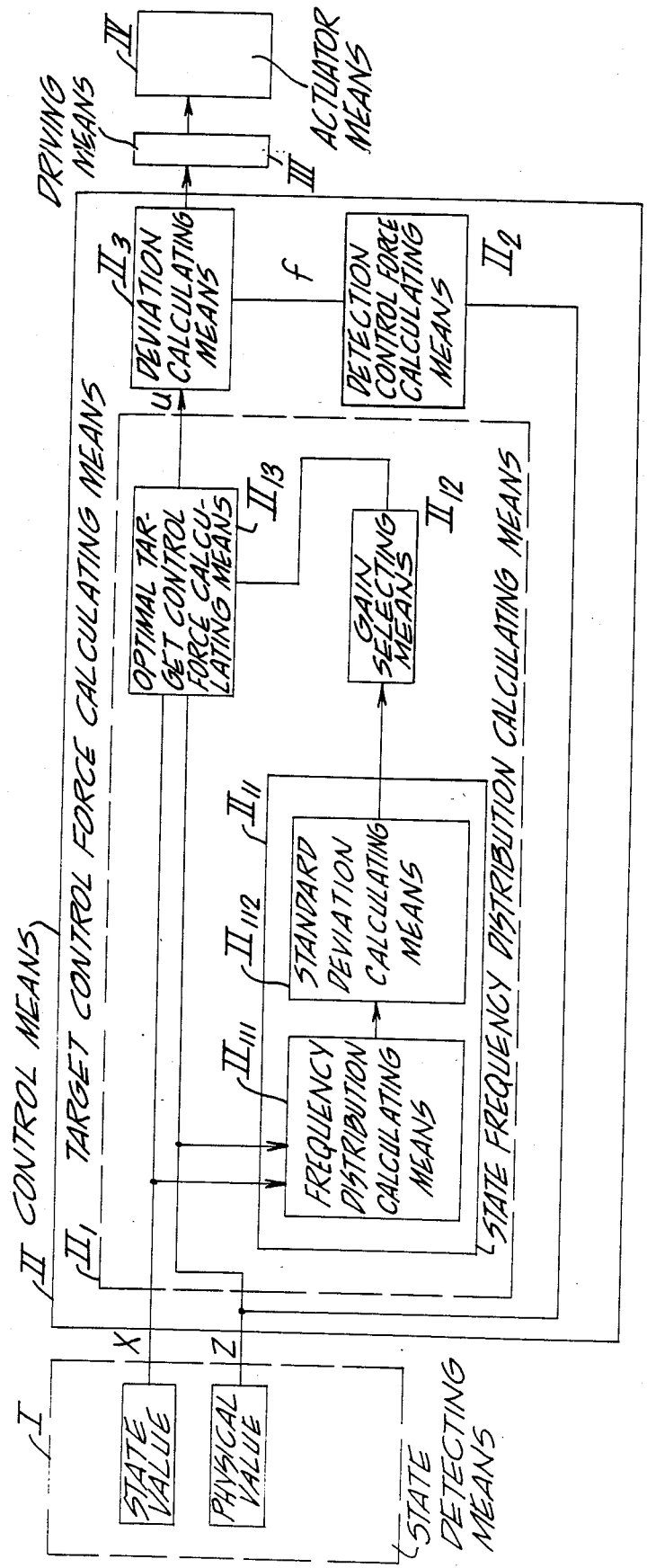
FIG. 4 is a schematic block diagram of an arrangement according to a first embodiment of the present invention.
Figure 5:
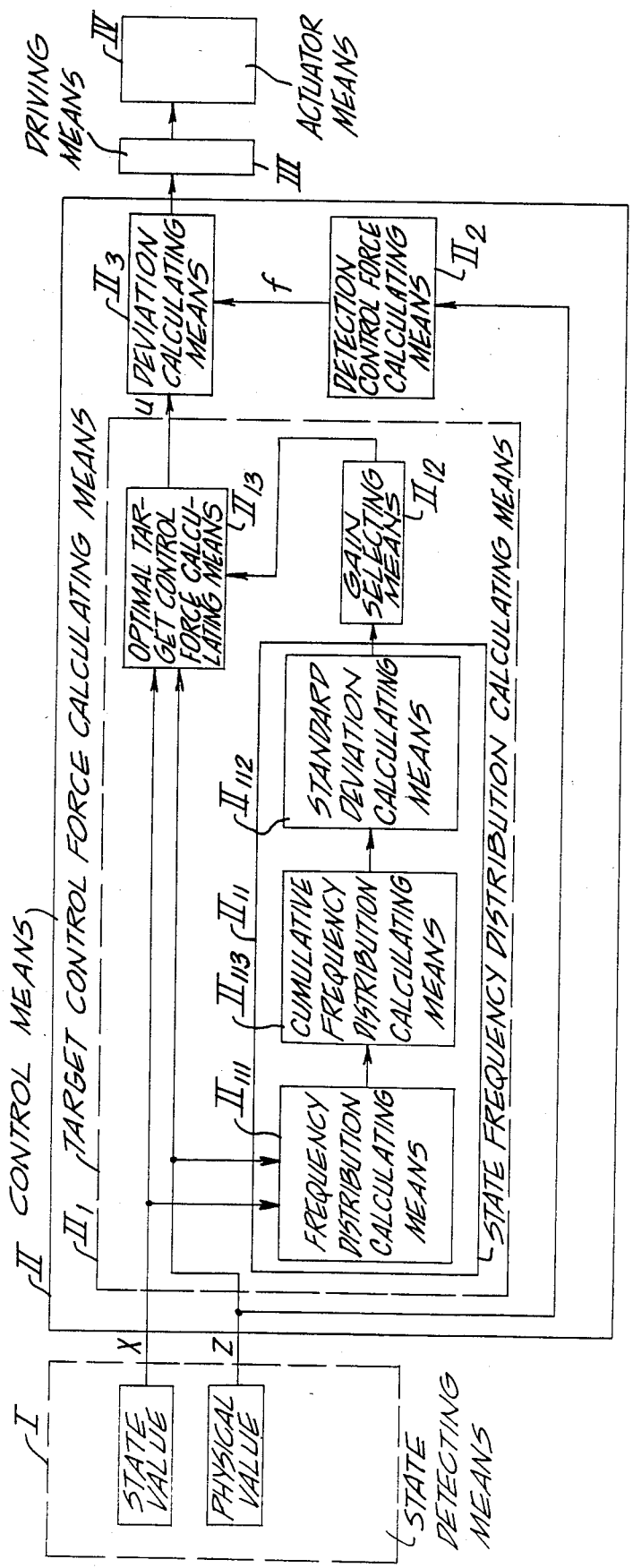
FIG. 5 is a schematic block diagram of an arrangement according to a second embodiment of the present invention.
Figure 3A:
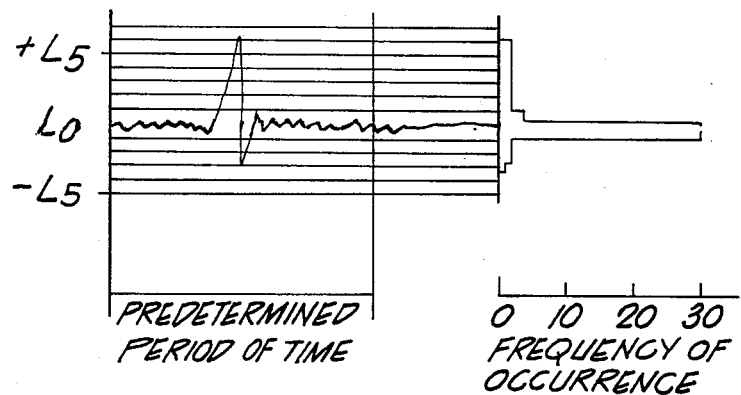
FIG. 3 is a view for explaining a frequency distribution.
Figure 3B:
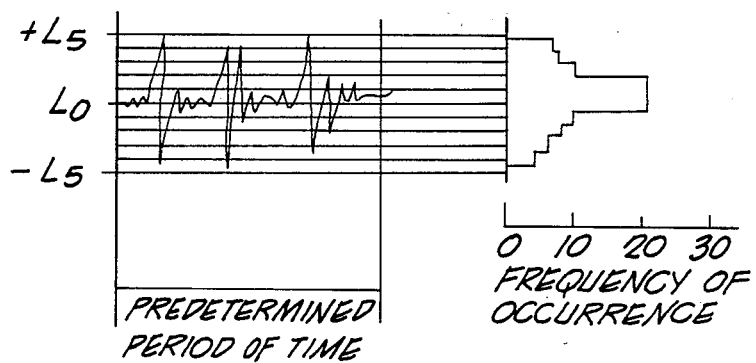

The vibration control apparatus in this embodiment basically belongs to the first aspect shown in FIG. 4 and comprises a state detecting means I, a control means II, a driving means III, and an actuator means IV. The control means II comprises a target control force calculating means $II_1$ and a deviation calculating means $II_3$. The target control force calculating means comprises a state frequency distribution calculating means $II_{11}$, a gain selecting means $II_{12}$ and an optimal target control force calculating means $II_{13}$. The control means II further comprises a sign control means $II_4$ and an integrating means $II_5$. The state frequency distribution calculating means $II_{11}$ comprises a frequency distribution calculating means $II_{111}$ and a standard deviation calculating means $II_{112}$.

Figure 6B:
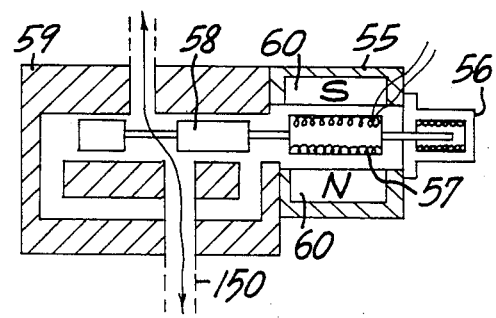
FIG. 6(b) is a sectional view of an actuator means IV thereof.
Figure 7:
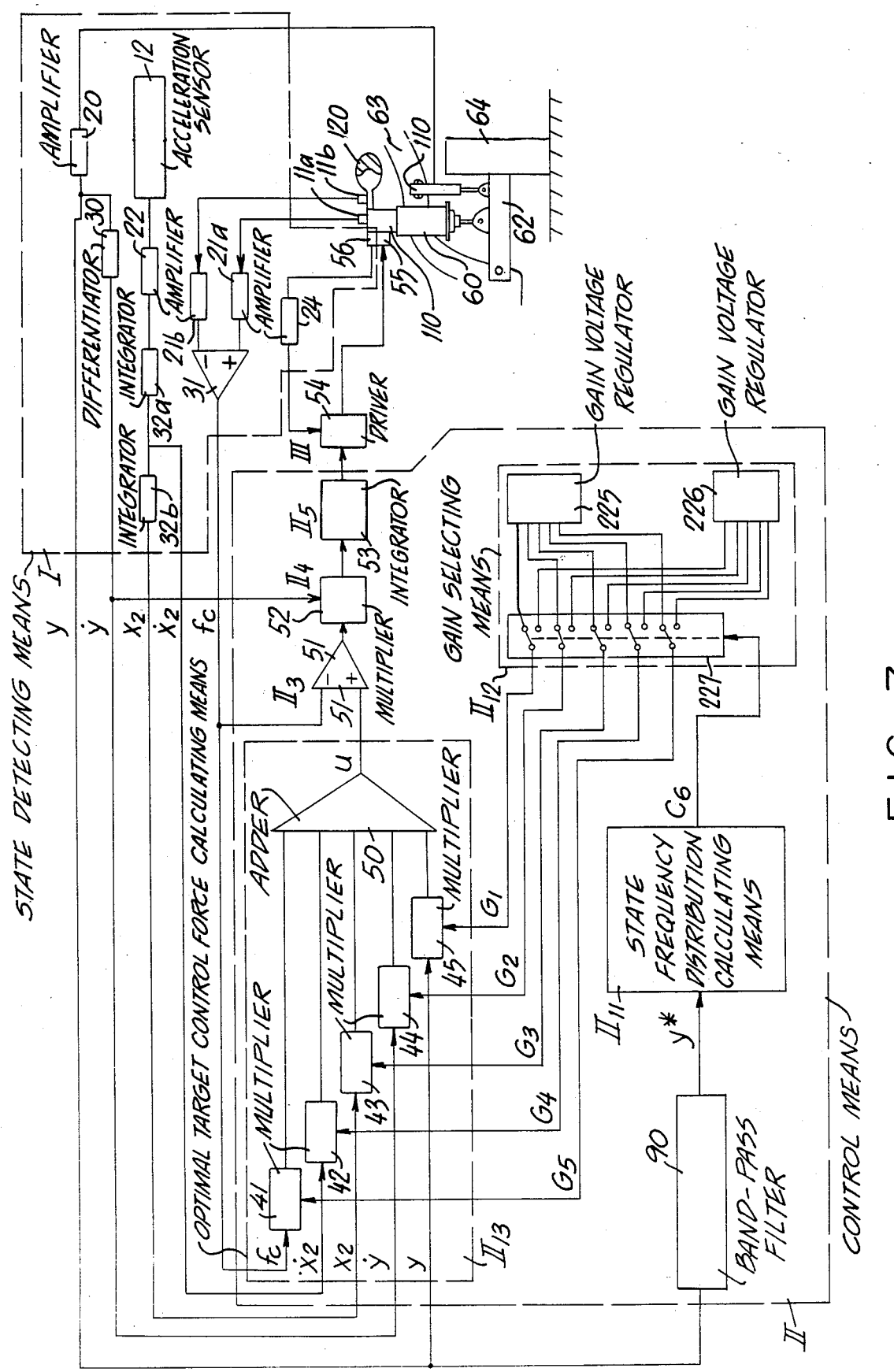

As shown in FIG. 7, the state detecting means I comprises a potentiometer 10 inserted between a body frame 63 and a suspension arm 62 for rotatably supporting a wheel to which the corresponding suspension is attached, an amplifier 20, connected to the potentiometer 10, for outputting a signal representing a relative displacement y between the axle and the vehicle body, a differentiator 30 for differentiating the relative displacement y output from the amplifier 20 and for detecting a relative speed $\dot{y}$, a pressure sensor 11a, mounted in a chamber of a hydraulic cylinder 110, for detecting a load acting on the wheel, an amplifier 21a for detecting a wheel load w on the basis of the pressure, a pressure sensor 11b mounted at the inlet of a hydraulic chamber of an accumulator 120, for detecting a damping force, an amplifier 21b, connected to the pressure sensor 11b, for amplifying an output from the pressure sensor 11b, a differential amplifier 31 for detecting a damping force fc representing a difference between outputs from the amplifiers 21a and 21b, an acceleration sensor 12, mounted on the body, for detecting an acceleration, an amplifier 22, connected to the acceleration sensor 12, for amplifying an output from the acceleration sensor 12, an integrator 32a for integrating an output from the amplifier 22 and detecting a sprung speed $\dot{x}_2$, an integrator 32b for further integrating an output from the integrator 32a and outputting a sprung displacement $x_2$, a displacement sensor 56, and an amplifier 24 for outputting a signal representing the displacement. The displacement sensor 56 detects a displacement of a spool 58 serving as a variable orifice for continuously controlling to open/close the hydraulic path 150 in the actuator means IV comprising a linear actuator 55 and a valve body 59, as shown in FIG. 6(b).

Figure 8:
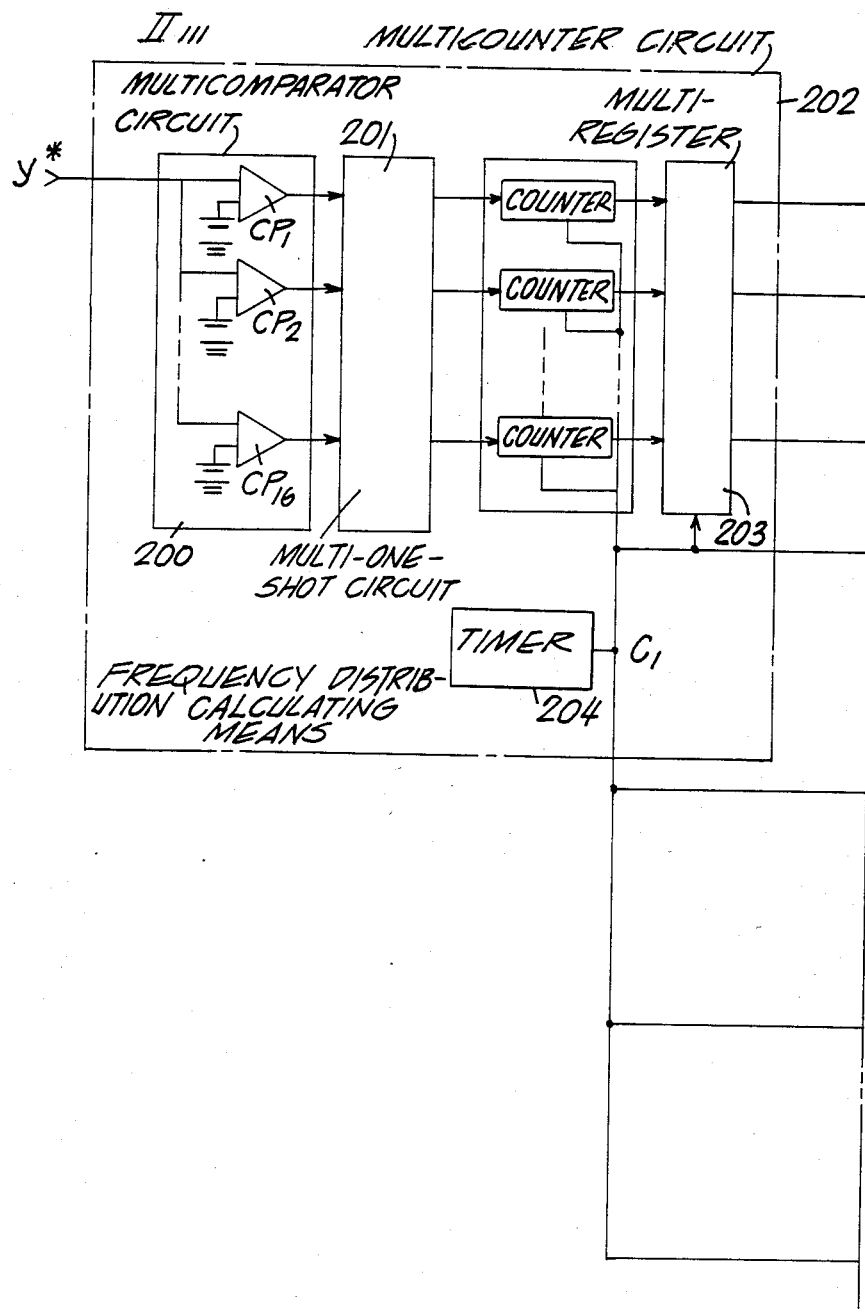
Figure 8:
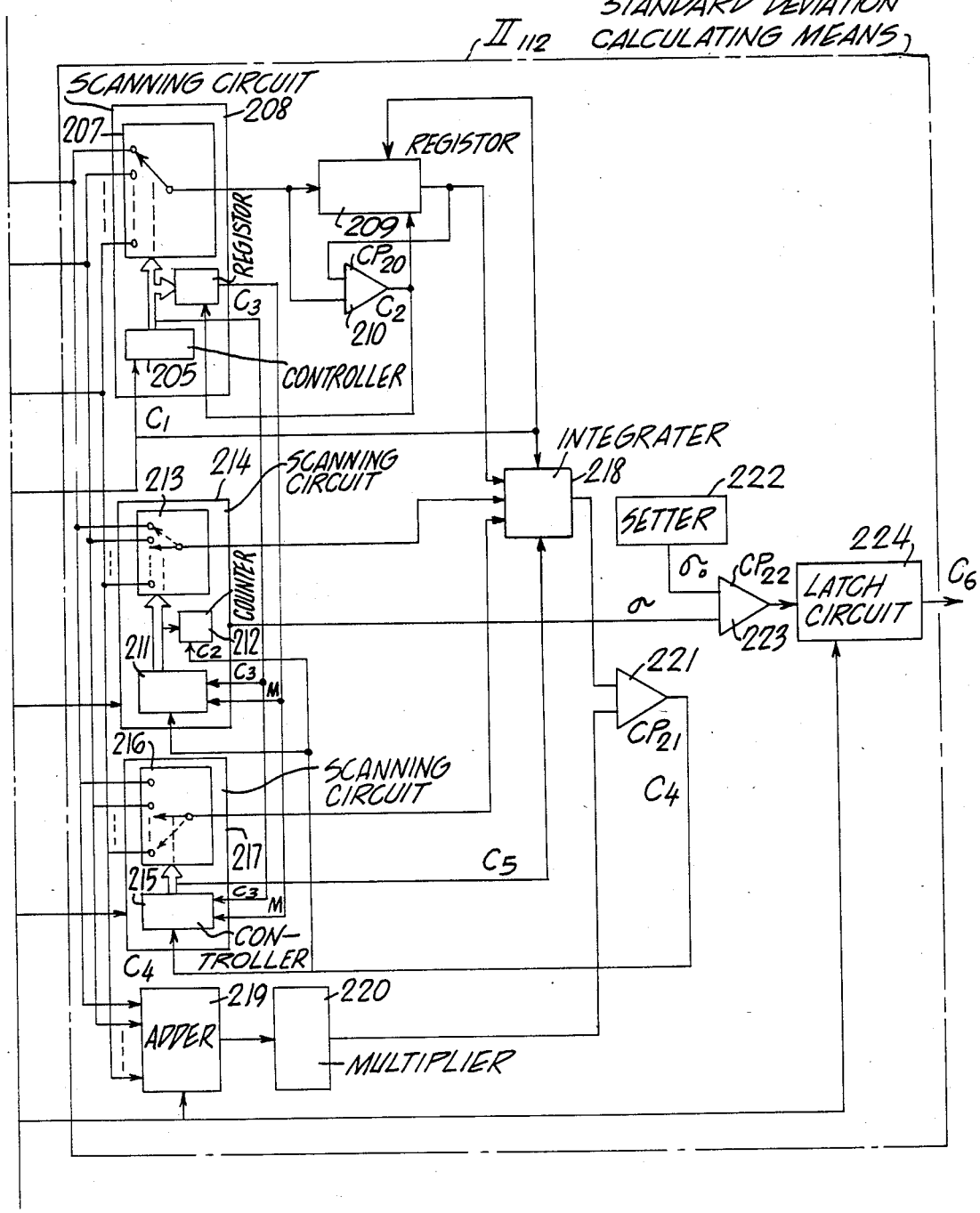

The state frequency distribution calculating means $II_{11}$ comprises a frequency distribution calculating means $II_{11}$ and a standard deviation calculating means $II_{12}$, as shown in FIG. 8.

The frequency distribution calculating means $II_{111}$ comprises a multicomparator circuit 200, a multi-one-shot circuit 201, a multicounter circuit 202, a multiregister 203, and a timer 204.

The multicomparator circuit 200 serves to detect an output y* of a suspension relative displacement signal y passing through a band-pass filter 90 having a band of 4 to 8 Hz, i.e., to detect that a positive/negative signal having information of a road surface associated with the suspension passes all 16 preset levels obtained by dividing a maximum value into 16 levels. For this purpose, the input terminals of the 16 comparators are connected in parallel with each other, and 16 reference level values are preset to the comparators, respectively. Each comparator generates a voltage of "0 V" when the input signal level is lower than the corresponding preset level. Otherwise, the comparator generates a voltage of "+5 V". For example, when the level of the suspension relative displacement y* passing through the band-pass filter 90 becomes lower than the preset level after the level displacement y* exceeds the preset level, the comparator output has a rectangular waveform in an order of "0 V", "5 V", and "0 V". In this case, although the signal level passes the preset level twice, only one rectangular pulse is output. Each one-shot circuit (of the multi-one-short circuit 201) for generating two rectangular 50-μsec pulses at the leading and the trailing edges of the comparator output waveform in the multicomparator 200 is connected to the corresponding comparator in the multicomparator 200.

The multicounter circuit 202 comprises 16 8-bit counters for counting output pulses of the one-short circuits in the multi-one-shot circuit 201, i.e., the frequencies of occurrence of the respective leves. The counter counts the input pulses for 1 second in response to an output pulse C1 from the timer 204, outputs a count for 50 μsec and is then reset. The above counting cycle is repeated.

The multiregister 203 has 16 registers corresponding to 16 counters of the multicounter circuit 202. When the output signal C1 from the timer 204 goes high, i.e., "+5 V", each register is reset and stores a count from the corresponding counter in the multicounter circuit 202. The register stores the count until the signal C1 is set at "+5 V" again. Therefore, the frequency distribution within every one second is calculated in the output of the multiregister 203.

The timer 204 continuously generates a rectangular pulse C1 having a pulse OFF duration of 1 sec and a pulse ON duration of 50 μsec.

The standard deviation calculating means $II_{112}$ comprises a scanning circuit 208 for detecting the maximum frequency of occurrence in the frequency distribution and its preset level, a register 209, a comparator 210, an adder 219 for calculating an average value of the frequency distribution, a multiplier 220, scanning circuits 214 and 217 for calculating a deviation of the maximum frequency of occurrence from the preset level when the average frequency of occurrence is obtained with respect to as the center the maximum frequency of occurrence in the frequency distribution, an integrator 218, a comparator 221, a setter 222 for comparing the deviation and the preset value and outputting a signal representing a smooth or rough road, a comparator 223, and a latch circuit 224.

The scanning circuit 208 comprises a multiplexer 207 having 16 channel inputs respectively corresponding to the 16 register outputs from the multiregister 203, for switching the channels from channel 1 to channel 16 to output the register outputs without modifications, a controller 205 for controlling switching of the input channels of the multiplexer 207 on the basis of a 4-bit signal, and a register 206 for storing the 4-bit signal output from the controller 205. The controller 205 is initialized in response to the leading edge of the output pulse C1 from the timer 204 and counts up by "1" in 4 bits every 50 μsec. The initial count value is "1". When the count reaches "16", the controller 205 stops counting the pulses and outputs the most significant bit as a control pulse signal C3. The register 206 restores the 4-bit output from the controller only when the output pulse C2 from the comparator is set at "+5 V".

The register 209 stores the output from the multiplexer 207, i.e., the frequency of occurrence obtained by counting passing of the input of the suspension relative displacement y* from the band-pass filter 90 through the preset levels, only when the output signal from the comparator 210 is set at "+5 V".

The comparator 210 compares the outputs from the multiplexer 207 with the data outputs from the register 209. When the output from the multiplexer 207 is smaller than that of the register 209, the comparator 210 generates "0 V". Otherwise, the comparator 210 generates "+5 V".

The scanning circuit 214 comprises a multiplexer 213 having the same function and input arrangement as those of the multiplexer 207, a controller 211 for controlling switching of the input channels of the multiplexer 213 on the basis of a 4-bit signal, and a 4-bit counter 212 for counting pulses of the least significant bit output from the controller 211. The controller 211 is started in response to the control pulse C3 output from the controller 205 in the scanning circuit 208 and decrements the count by "1" every 50 sec in response to a 4-bit output m from the register 206. The counter operation is stopped when an output pulse signal C4 from the comparator 221 is set at "+5 V". The channels of the multiplexer 213 are sequentially switched from channel m in an order of m−1, m−2, ... until the output pulse singal C4 from the comparator 221 is set at "+5 V". The counter 212 continuously counts the pulses until the output pulse signal C4 from the comparator 221 issset at "+5 V".

The scanning circuit 217 comprises a multiplexer 216 and a controller 215 and has the same function and signal connections as those of the scanning circuit 214 except for the counter 212. The controller 211 outputs the 4-bit count value decremented by "1" every 50 μsec from channel m, while the controller 215 outputs the 4-bit count value incremented by "1" every 50 μsec from channel m. The increment and decrement timings by "1" every 50 μsec of the controllers 211 and 215 are synchronized, although not illustrated.

The integrator 218 multiplies outputs from the multiplexers 213 and 216 with the output from the latch circuit 209 in synchronism with the least significant bit signal from the controller 215.

The adder 219 adds the outputs from the multiregister 203 in response to the output signal C1 from the timer 204. In other words, all frequencies of occurrence obtained by counting passing of the suspension relative displacement y* from the low-pass filter 90 through the preset levels within one second are calculated. An output from the adder 209 is multiplied with 0.683 by the multiplier 220 to obtain the average frequency of occurrence.

The comparator 221 compares the output from the integrator 218 with the output from the multiplier 220. When the output from the integrator 218 is smaller than that from the multiplier 220, the comparator 221 outputs "0 V". Otherwise, the comparator 221 outputs "+5 V". When the comparator 221 outputs "+5 V", the output from the counter 212 in the scanning circuit 214 represents a standard deviation $\sigma$ of the frequency distribution.

The setter 222 outputs a standard deviation $\sigma_0$ for discriminating a smooth road from a rough road. The comparator 223 compares the output $\sigma_0$ from the setter 222 with the output $\sigma$ from the counter 212. If $\sigma_0 > \sigma$, then the setter 222 discriminates that the road is smooth and outputs "0 V". Otherwise, the setter 222 discriminates that the road is rough, and then outputs "+5 V".

When the output pulse signal C1 from the timer 204 is set at "+5 V", the latch circuit 224 stores the output from the comparator 223 and continuously outputs data C6 until the signal C1 rises to "+5 V" again.

The gain selecting means $II_{12}$ comprises gain voltage regulators 225 and 226 for converting the optimal gains corresponding to five state values of the smooth and rough roads into voltages and outputting the converted voltages, and a multiswitch 227 for outputting as optimal gains G1 to G5 outputs for smooth road from the gain voltage generator 225 or outputs for rough roads from the voltage generator 226, on the basis of the output pulse C6 from the latch circuit 224 in the state frequency distribution calculating means $II_{11}$.

The optimal target control force calculating means $II_{13}$ comprises five multipliers 41 to 45 for calculating an optimal target control force u on the basis of the optimal gains G1 to G5 output from the multiswitch 227 and the corresponding state signals, and an adder 50 for adding the outputs from the multipliers 41 to 45:

$$u = G_1 \cdot y + G_2 \dot{y} + G_3 \cdot x_2 + G_4 \dot{x}_2 + G_5 \cdot fc \tag{1}$$

The deviation calculating means $II_3$ comprises a deviation calculator 51 for calculating a deviation $\epsilon$ of the damping force fc from the optimal target control force output from the optimal target control force calculating means $II_{13}$.

The sign control means $II_4$ comprises a multiplier 52 for multiplying an output $\epsilon$ from the deviation calculator 51 with the suspension relative speed $\dot{y}$. The multiplier 52 determines whether the deviation $\epsilon$ from the target control force can be controlled by the damping force in damping force control on the basis of the deviation from the target control force u. If control can be performed, the multiplier 52 outputs a signal representing the sign of the damping force. Otherwise, the multiplier 52 outputs a signal for decreasing the damping force to zero.

The sign control function of the multiplier 52 will be described with reference to the following table and FIG. 6(a).

TABLE

| Relative Speed y | Positive (Contraction) | | | Negative (Elongation) | | |
|---|---|---|---|---|---|---|
| Target Control Force u | Positive | Nega- tive | Posi- tive | Negative | | |
| Control Based on u | Possible | | Impossible | | Possible | |
| Deviation $\epsilon$ | Posi- | Nega- | Nega- | Posi- | Posi- | Nega- |

TABLE-continued

| Relative Speed ẏ | Positive (Contraction) | | | Negative (Elongation) | | |
|---|---|---|---|---|---|---|
| = u − fc | tive | tive | tive | tive | tive | tive |
| Multiplier Output εẏ | Positive | Negative | Negative | Negative | Negative | Positive |
| Increase/Decrease in Damping Force fc | Increase | Decrease | Decrease | Decrease | Decrease | Increase |
| Operation Direction of Orifice | Close | Open | Open | Open | Open | Close |

The upward direction of the target control force u with respect to the body is positive, and the contraction direction of the hydropneumatic suspension relative speed ẏ is defined as positive. When the direction of the target control force u is the same as that of the relative speed ẏ, for example, when the piston of the hydraulic cylinder 110 is moved upward (positive direction), and the target control force u signal is also directed upward (positive direction), the oil in the hydraulic cylinder 110 is flowed into the hydropneumatic spring 120 through the orifice 130 in proportion to the relative speed ẏ. Therefore, the opening of the orifice 130 can be changdd in accordance with a control signal. Then, the internal pressure of the hydraulic cylinder 110, i.e., the damping coefficient or the magnitude of the upward (positive) damping force fc can be changed. In this case, the control signals are output in the following manner. When the output from the deviation calculator 51 is positive (u>fc), the orifice opening is decreased, and the damping coefficient and hence the damping force are increased. However, when the output from the deviation calculator 51 is negative (u<fc), the orifice opening is increased and the damping coefficient and hence the damping force are decreased. When the piston of the hydraulic cylinder 110 is moved downward (negative direction) and the target control force u also acts downward (negative direction), the oil is flowed from the hydropneumatic spring 120 to the hydraulic cylinder 110 through the orifice, the orifice opening is controlled in the same manner as described, thereby changing the magnitude of the downward damping force fc. In this case, the control signals are generated as follows. If the deviation is positive (−u>−fc), the orifice opening is increased, and the damping coefficient and hence the damping force are decreased. However, when the deviation is negative (−u<−fc), then the control signal is output such that the direction of the orifice opening is the closing direction and that the damping coefficient is increased to equivalently increase the damping force acting on the suspension. Therefore, when the sign of the target control signal u is the same as that of the suspension relative speed ẏ, the damping force fc can be controlled on the basis of the target control force u. However, when the direction of the target control force u is opposite to that of the relative speed ẏ, e.g., when the piston in the hydraulic cylinder 110 is moved upward (positive direction) and the target control force u acts downward (negative direction), the oil in the hydraulic cylinder 110 is flowed in the hydropneumatic spring 120 through the orifice. Therefore, if the orifice opening is kept to be a predetermined value (unless it is controlled), the upward (positive direction) damping force acts on the suspension together with the relative speed ẏ. Therefore, the damping force cannot be controlled on the basis of the target control force u.

In this case, the orifice is fully opened on the basis of the control signal and the damping coefficient can be minimized, and hence the positive damping force fc equivalently acting on the suspension is decreased. This results in an operation as if the target control force u is added to the damping force fc under no control, thus decreasing the damping force fc. In this case, the output ε (=u−fc) from the deviation calculator 51 is always negative since the direction of the target control force u is negative and the damping force fc is positive as compared with the relative speed ẏ.

When the piston of the hydraulic cylinder 110 is moved downward (negative) and the direction of the target control force u is upward (the positive direction), the damping force cannot be controlled on the basis of the target control force u for the same reason as described above. The orifice is fully opened on the basis of a control signal, and the damping coefficient is minimized. It is thus preferable to minimize the damping force equivalently acting on the suspension. In this case, the output ε (=u−fc) from the deviation calculator 51 is always positive since the target control force u is positive and the damping force fc is negative as compared with the relative speed ẏ. When the direction of the target control force u is opposite to that of the relative speed ẏ, the damping force cannot be controlled on the basis of the target control force u. Therefore, the orifice is fully opened in accordance with the control signal, and the damping force is decreased.

The control directions of the damping forces and the orifice opening on the basis of the output ε from the deviation calculator 51 are summarized in the above table. In order to basically achieve this logic, the sign of the suspension relative speed ẏ having the same direction as that of the damping force is multiplied with the sign of the deviation ε, and the resultant output is a control signal corresponding to the control direction of the orifice. The control signal designates only the increase/decrease direction of the damping force. In order to increase a ratio of the deviation ε signal for the target control force to noise, i.e., an S/N ratio, the deviation ε is directly multiplied with the relative speed ẏ by the multiplier 52, and an output εẏ from the multiplier 52 is used as a control signal.

The integrating means II$_5$ comprises an operational amplifier and an integrator 53 of a resistor R and a capacitor C for determining an integration gain. In order to eliminate an offset value (i.e, a residual deviation) of the deviation of the damping force fc from the target control force u by integrating the output εẏ from the multiplier 52 as a function of time, a damping force of the suspension is detected and fed back to the integrating means. At the same time, an integration gain $K_k$ (=1/CR) is set to be $K_k$=2400 in consideration of response time and stability of the control system. In order to prevent a drift in the integrator itself, the output from the integrator is fed back thereto by utilizing the resistor.

The driving means III comprises a driver 54 for negatively feeding back a spool displacement signal from the actuator means IV to the output from the integrator 53 and for outputting a current in proportion to the deviation signal.

As shown in FIG. 6(b), the actuator means IV comprises the valve body 59 integrally mounted on the hydraulic cylinder 110 of the hydropneumatic suspension mounted on the suspension arm 62 and the body frame 63, the hydraulic path 150 for causing the hydraulic chamber of the accumulator 120 to communicate with the hydraulic chamber of the hydraulic cylinder 110, the spool 58 serving as a variable orifice for continuously opening/closing the hydraulic path 150, a moving coil 57 of the linear actuator 55 arranged integrally with the spool 58, a permanent magnet 60 for applying a force corresponding to the current generated as an output from the driver 54 and flowing through the moving coil, the displacement sensor 56, mounted on the linear actuator 55, for detecting a spool displacement for limiting a force acting on the moving coil, and the amplifier 24 for outputting a signal representing the displacement of the spool.

The operation of the first embodiment having the arrangement described above will be described below.

In the traveling state of a motor vehicle, a relative suspension displacement signal y detected by the linear potentiometer 10 is wave-shaped through the band-pass filter 90 into a signal waveform y* having information of a road surface. The signal y* is output as pulses derived from the frequency of occurrence obtained by counting passing of the signal through the preset levels through the multicomparator circuit 200 and the multi-one-shot circuit 201. The pulses are counted by the multicounter circuit 202 every second, and the counts are stored in the multiregister. Therefore, an input to the multiregister represents a frequency distribution per second. The multiplexer 207 in the scanning circuit 208 sequentially switches the first to 16th registers in the multiregister. The output from the multiplexer 207 is compared with the output from the register 209 by the comparator 210. If the output from the multiplexer 207 is larger than the output from the register 209, the storage data in the register 209 is updated. The maximum frequency of occurrence is stored in the register 209. The register number m of the multiregister which has the maximum frequency of occurrence is stored in the register 206 in the scanning circuit 208.

The channels are updated to the upper and lower channels from the $(m-1)$th and $(m+1)$ channels of the multiplexers 213 and 216 in the scanning circuits 214 and 217 on the basis of the output m from the register 206 in the scanning circuit 208. The frequencies of occurrence stored in the registers of the multiregister 203 which are connected to the updated channels are accumulated by the integrator 218 with the maximum frequency of occurrence stored in the register 209. At the same time, the comparator 221 compares the average frequency of occurrence, i.e., 68.3% of all frequencies of occurrence calculated by the adder 219 and the multiplier 220 with the frequency of occurrence output from the integrator 218. If the output from the integrator 218 exceeds the average frequency of occurrence, the scanning circuits 214 and 217 are stopped, the number of channels (=the number of registers shifted from the mth register in the multiregister 203, in which the mth register stores the maximum frequency of occurrence) updated from channel m in the multiplexer 213, i.e., the standard deviation $\sigma$ calculated by the 1-second frequency distributions obtained by the multiregister 203 can be counted by the counter 212 in the scanning circuit 214.

The deviation $\sigma$ and the standard deviation $\sigma_0$ for determining the road state are compared by the comparator 223. The optimal gains G1 to G5 for the smooth and rough roads which are preset on the basis of the latch circuit 224 are selected by the multiswitch 227, and the optimal target control force u calculated according to equation (1) is output from the adder 50. A deviation of the damping force fc from the target control force u is calculated and is multiplied with the relative speed by the multiplier 52 to generate a control signal. The integrator 53 and the driver 54 are controlled on the basis of this control signal, and a corresponding current is supplied to the linear actuator 55, thereby moving the spool 58. In this manner, the damping coefficient is changed, and the damping force fc can be continuously changed.

In the vibration control apparatus operated as described above, the information of the road surface state is extracted by the relative displacement signal y of the suspension, the frequency distribution per second can be continuously calculated without discontinuity, and the standard deviation of the frequency distributions is calculated, thereby detecting the road surface state. Therefore, the damping force fc can be continuously controlled on the basis of the signal of the optimal control force u calculated on the basis of the optimal gains obtained by linear models for the smooth and rough roads. The control force can be optimally applied to the smooth and rough roads. As a result, the passenger can enjoy riding comfort and driving stability can be further improved.

In addition, the road surface state is defined by a value as the standard deviation and therefore can be accurately detected.

The sign control means II$_4$ calculates a product $\epsilon \dot{y}$ of the deviation $\epsilon$ from the target control force and the relative speed $\dot{y}$ of the suspension, so that the signal level can be higher than that of the deviation $\epsilon$. Therefore, the good control signal $\epsilon \dot{y}$ having a high S/N ratio can be obtained. The offset component (residual deviation) which adversely affects control of soft components (0.2 Hz to 2 Hz) of sprung vibraions which greatly influence riding comfort can be eliminated by the integrator 53 for integrating the control signal as a function of time. Therefore, damping control including control of the soft components of the target control force u can be performed to obtain an optimal vibration level. At the same time, a gain is small for noise having a high frequency which adversely affects damping force control, and a gain is high for a frequency required for vibration control. Therefore, stability of the control system can be improved.

The actuator means IV for controlling the damping force fc does not utilize a return spring against a force generated by the linear actuator, but utilizes feedback of the spool displacement. Therefore, the spool can be moved with a low electrical energy level. The force generated by the spool displacement can be effectively utilized. The response time can be shortened, and small vibrations having a high frequency can be controlled. In addition, the power source such as a hydraulic source and a pneumatic source need not be used. The weight, space, and cost of the pipes can be advantageously reduced.

The sign control means II$_4$ in the first embodiment uses the multiplier 52. However, the multiplier may be replaced with a divider.

Second Embodiment

Figure 9:
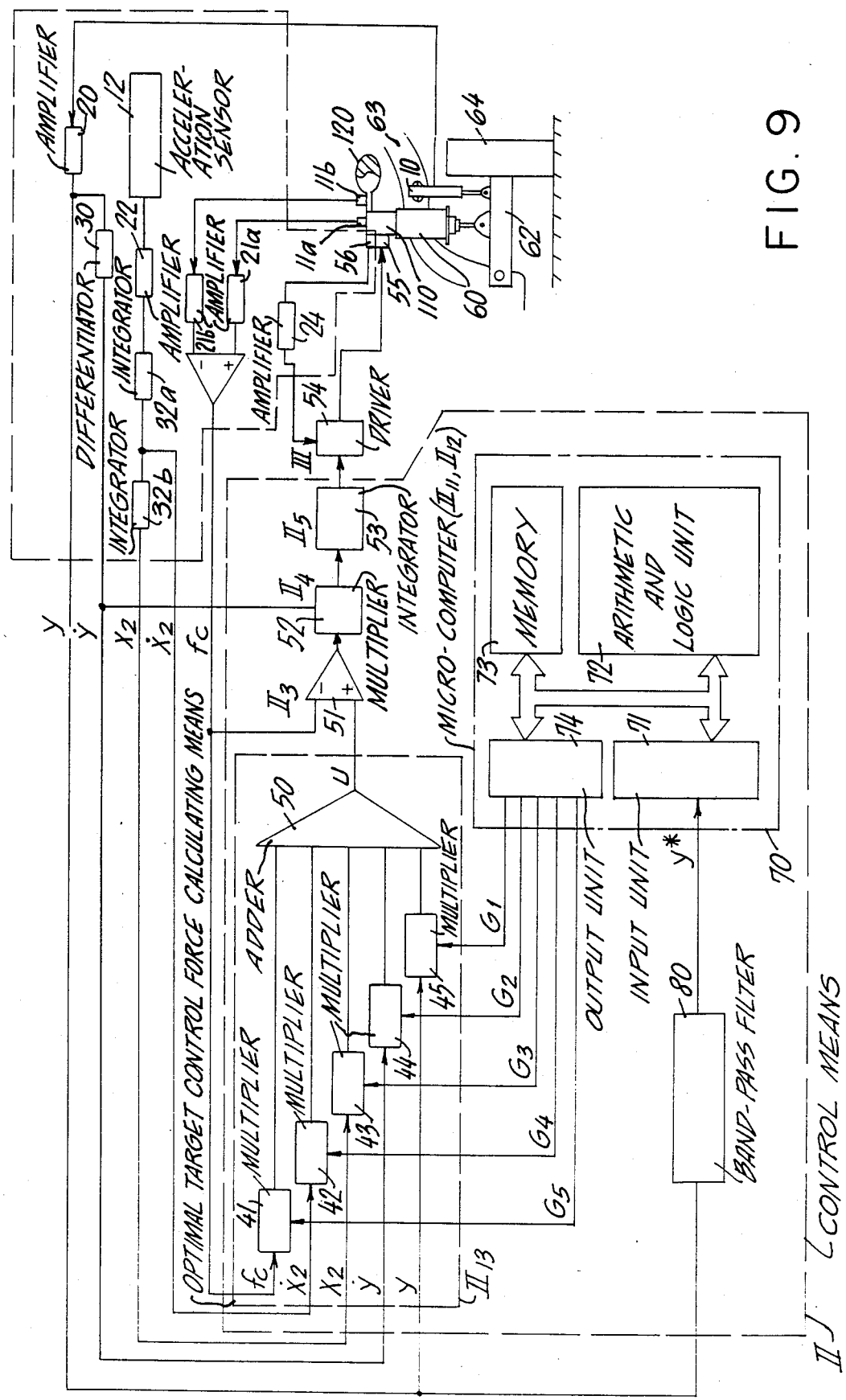

The second embodiment exemplifies a hydropneumatic suspension apparatus for a motor vehicle according to the second aspect of the present invention in the same manner as in the first embodiment of FIG. 7. The suspension apparatus has an overall system configuration shown in FIG. 9. The arrangement of the second embodiment is substantially the same as that of the first embodiment, except for a state frequency distribution calculating means $II_{11}$ and a gain selecting means $II_{12}$, both of which are surrounded by the alternate and short dashed line, and a detailed description of the remaining portion will be omitted.

Figure 10:
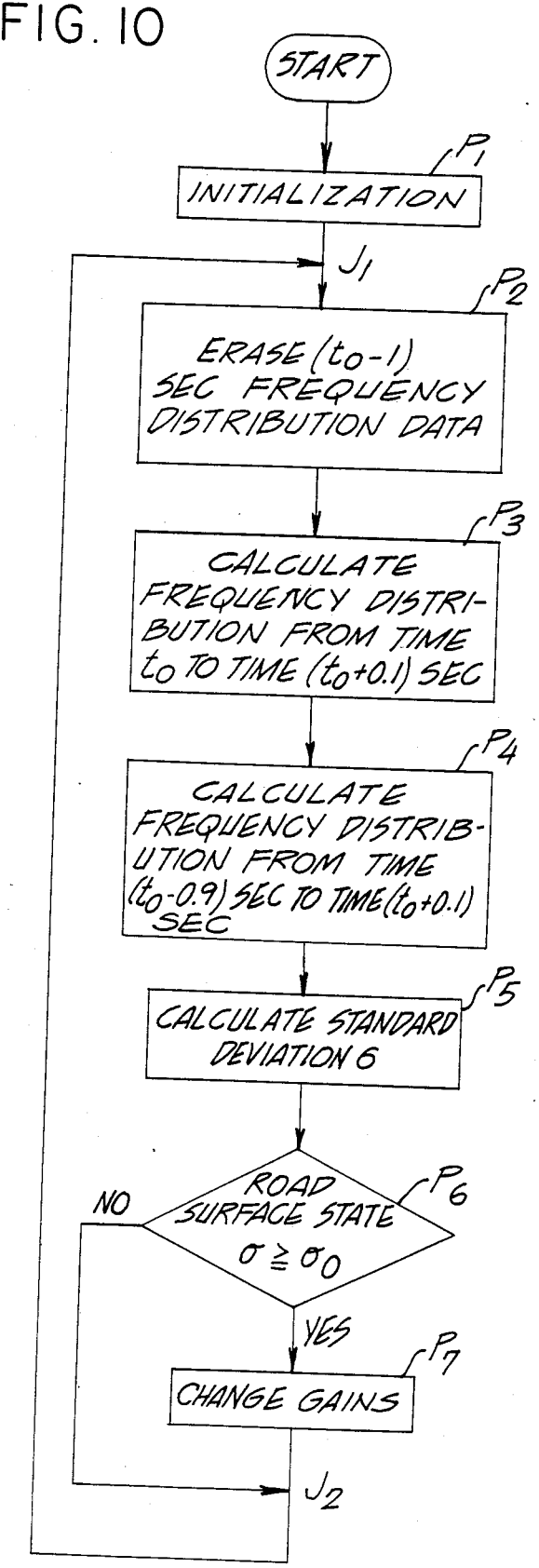
Figure 11:
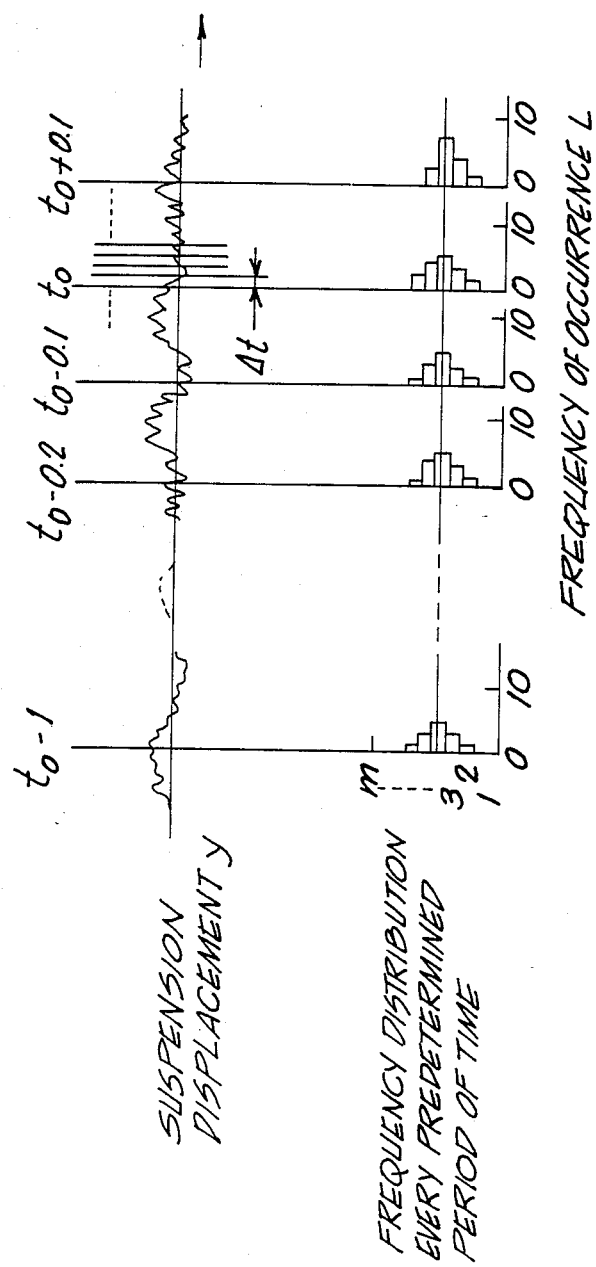

A control means II comprises a microcomputer 70 having a state frequency distribution calculating means $II_{11}$ with a frequency distribution calculating means $II_{111}$, a cumulative frequency distribution calculating means $II_{113}$, and a standard deviation calculating means $II_{112}$; and a gain selecting means $II_{12}$. The microcomputer 70 comprises an input unit 71 for receiving a suspension relative displacement y* passing through a band-pass filter 80 having a band of 4 to 8 Hz, a first arithmetic and logic unit for discriminating an external state on the basis of the input and selecting an optimal gain, a memory 73 for storing an algorithm of the first arithmetic and logic unit and 1-sec frequency distribution data from time one second ahead of the current time for discriminating the road surface state, a second arithmetic and logic unit 722 for calculating a target control coefficient on the basis of the input from the input unit 71 and the optimal gains selected by the first arithmetic and logic unit 721, and an output unit 74 for outputting the result from the second arithmetic and logic unit 722. The wheel suspension is replaced with a vibration model, and the state values (i.e., the relative displacement y, the relative speed ẏ, the sprung displacement $x_2$, the sprung speed $\dot{x}_2$, and the damping force fc) are calculated using the optimal gains G1 to G5 according to the linear least square estimation. The detailed functions of the microcomputer 70 will be described with reference to the flow chart of FIG. 10 and the view for explaining a method of calculating a cumulative frequency distribution in FIG. 11.

The ten 0.1-sec frequency distribution data from time t0 of road surface discrimination to time one second ahead of time t0 are stored in memory blocks M0 to M9, respectively, after initialization is performed in step P1. In step P2, the data in the memory block M8 is transferred to the block M9; data in M7, to M8, ..., data in M0 to M1. The 1-sec frequency distribution data stored from time t0 in the block M9 is erased. In step P3, the 0.1-sec frequency distribution data are initialized, and a change in suspension displacement y* after 0.1 sec is sampled every 0.01 sec. The sampled levels are compared with the levels obtained by dividing the maximum suspension displacement into 16 levels to determine the reference level to which the sampled levels belong. The contents of the memory corresponding to the discriminated level are incremented by one. This operation is repeated until 0.1 sec. In this manner, the 0.1-sec frequency distribution data can be calculated. When 0.1 sec has elapsed after time t0, the (t0+0.1)-sec frequency distribution data, i.e., the memory count data corresponding to the reference levels 0 to 16 is stored in the empty memory block M1 by the operation in step P2. At the same, the sampled data in the blocks M0 to M9 are accumulated in units of reference level intervals, thereby calculating cumulative frequency distribution data.

In step P5, the peak of the distribution is searched according to the cumulative frequency distribution data, and the data is swept every ±1 level using the detected level as the center. The frequency of occurrence is then accumulated, and the number of level intervals which exceeds 68.3% of a total frequency of occurrence is defined as a standard deviation $\sigma$. In step P6, if the standard deviation calculated in step P6 is smaller than 4, the road is detected as a smooth road. Otherwise, the road is detected as a rough road. In step P7, the wheel suspension is replaced with a linear two-variable model, and the active-controlled suspension is assumed. By using the least square estimation scheme, the optimal gains G1 to G5 (for smooth and rough roads) for the relative displacement y, the relative speed ẏ, the sprung displacement $x_2$, the sprung speed $\dot{x}_2$, and the damping force fc are calculated and read from the memory 73. The readout data is then output from the output unit 74.

The operation of the second embodiment will be described below.

The relative displacement signal y of the suspension is filtered through the band-pass filter, and the signal y* representing the road surface state is fetched every 0.01 sec by the microcomputer 70. The frequency distribution is calculated every 0.1 sec, and the 1-sec previous cumulative frequency distribution is calculated. The standard deviation $\sigma$ is calculated on the basis of the cumulative frequency distribution to determine whether the road is a smooth or rough road. The optimal gains G1 to G5 corresponding to the road surface state are output. The subsequent operations are the same as those in the first embodiment, and a detailed description thereof will be omitted.

In the vibration control apparatus operated as described above, the road surface state can be measured by using the relative displacement y of the suspension. The optimal control gains in consideration of the 1-sec previous road surface state change can be calculated every 0.1 second. An optimal target control force u calculated based on the optimal control gains can be used to continuously control the damping force fc. As compared with the conventional vibration control apparatus, the response characteristics can be improved, and steady control for the pulsed change in road surface state by a bump or noise can be performed. As a result, shock caused by unnecessary gain switching can be eliminated, so that the passenger can enjoy riding comfort and driving stability can be improved.

The road surface state is measured by the suspension displacement y. Therefore, additional sensors and the corresponding processors need not be required in an existing vibration control apparatus, thereby reducing the space and cost.

The road surface state measuring signal is the suspension displacement y. However, any other state signal or a signal from a sensor for directly detecting a road surface state can be used.

Figure 6A:
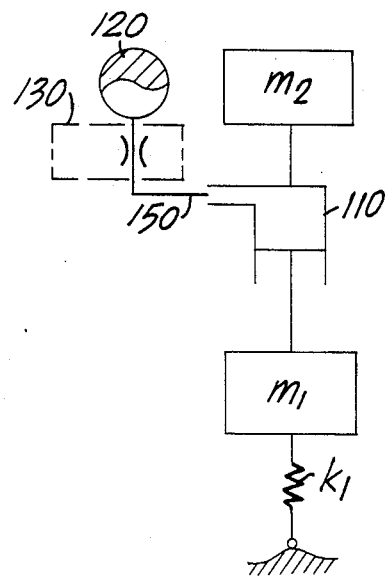
FIG. 6(a) is a schematic diagram showing a hydropneumatic suspension for a motor vehicle.

In the first embodiment, the sprung mass m is detected by the pressure sensor 11a (FIG. 6(a)) on the hydraulic cylinder 110 in the vibrating body state discriminating means. However, the signal of the relative displacement y may be used.

In each embodiment described above, the state signals used for vibration control are the relative displacement y, the relative speed ẏ, the sprung displacement $x_2$, the sprung speed $\dot{x}_2$, and the damping force fc. However, other state signals may be used. In addition, the number of state signals is not limited to a specific number.

What is claimed is:

1. A vibration control apparatus comprising:
state detecting means for detecting a physical value influencing characteristics of a suspension for supporting a vibrating body and for detecting a state value representing movement of the suspension:
control means comprising target control force calculating means for calculating an optimal target control force in consideration of an external force or disturbance acting on the suspension, on the basis of the physical and state values as outputs from said state detecting means, detection control force calculating means for calculating a detection control force corresponding to the physical value detected by said state detecting means, and deviation calculating means for detecting a deviation of the detection control force from the target control force;
driving means for amplifying a deviation signal representing deviation of the detection control force from the target control force and generated by said deviation calculating means and for generating a power output signal based on the amplified deviation signal; and
actuator means for continuously, variably controlling the suspension characteristics so as to equivalently generate a control force corresponding to the deviation of the detection control force from the target control force in consideration of the external force or disturbance acting on the suspension, on the basis of said power output signal;
said target control force calculating means comprising;
state frequency distribution calculating means for receiving as an external state signal, the input signal representing the state or physical value output from said state detecting means, for counting a frequency of passing, in units of preset levels, every time the input signal passes through the preset levels representing degrees of states of the input signal to calculate a frequency distribution of the preset levels every predetermined period of time, and for continuously discriminating an external state according to said calculated frequency distribution;
gain selecting means for selecting optimal values of prestored gains on the basis of the frequency distribution from said state frequency distribution calculating means; and
optimal target control force calculating means for multiplying the gains selected by said gain selecting means with the state or physical value signal output from said state detecting means and for adding the products obtained by the successive results of multiplying the gains with the state or physical value signal to obtain the optimal target control force,
wherein the frequency distribution of the state or physical value is calculated by said state frequency distribution calculating means to accurately, continuously detect a change in the external state, the optimal target control force is calculated using the gains corresponding to the change in the external state, and an optimal target control force free from influence of a pulsed external force or disturbance component is generated, thereby continuously, optimally, variably controlling the suspension characteristics.

2. An apparatus according to claim 1, wherein said state frequency distribution calculating means comprises:

determining means for calculating an average level value of the frequency distribution and means for comparing a deviation of the average level value with a preset value serving as a reference to decide the external state and for outputting the comparison result 3. An apparatus according to claim 2, wherein said frequency distribution calculating means comprises: a plurality of parallel-connected comparing means, having different preset levels, for generating outputs, levels of which are changed when input signal levels pass or cross the preset levels; pulse generating means, connected to outputs of said plurality of comparing means, for generating pulse outputs corresponding to changes in outputs from said plurality of comparing means; counting means, connected to said pulse generating means, for counting output pulses from said pulse generating means; and a register for storing outputs from said counting means.

4. An apparatus according to claim 2, wherein said determining means comprises: means for detecting a maximum frequency of occurrence in the frequency distribution and a corresponding preset level; means for calculating an average frequency in the frequency distribution; means for calculating a deviation of the maximum frequency occurrence from the preset level when the maximum frequency of occurrence as the center in the frequency distribution reaches the average frequency of occurrence; and means for comparing the deviation with the preset value serving as the reference to decide the external stat and for discriminating the external state to determine whether a road is a smooth or rough road.

5. An apparatus according to claim 4, wherein said means for detecting the maximum frequency of occurrence in the frequency distribution and the corresponding preset level comprises:
a first scanning circuit comprising a first multiplexer for selecting outputs from a plurality of channels of said frequency distribution calculating means, a first controller for generating a selection control signal for designating an order of selection of channels of said first multiplexer, and a first register for storing the selection control signal;
a second register for storing the output from said first multiplexer;
a first comparator for comparing an output from said second register with an output from said first multiplexer, and for generating a control signal to cause the output from said first multiplexer to update contents of said second register and to cause said first register to store an output from said first controller when the output from said multiplexer is larger than the output from said second register.

6. An apparatus according to claim 5, wherein said means for calculating the deviation of the maximum frequency of occurrence from the preset level when the average frequency of occurrence reaches the maximum frequency of occurrence as the center in the frequency distribution comprises:
a second scanning circuit comprising a second multiplexer for selecting the outputs of the plurality of channels of said frequency distribution calculating means, a second controller for generating a second selection control signal for designating an order of selection of the channels by said second multiplexer, the second selection control signal being set on the basis of the contents of said first register and being decremented every predetermined period of time, and a counter for counting the second selection control signal;

a third scanning circuit comprising a third multiplexer for selecting outputs of the plurality of channels of said frequency distribution calculating means, and a third controller for generating a third selection control signal for designating an order of selection of the channels by said third multiplexer, the third selection control signal being set on the basis of the contents of said first register and being incremented every predetermined period of time;

an accumulator for accumulating outputs from said second and third multiplexers on an ouptut from said second register in synchronism with a signal incremented one by one every predetermined period of time and output from said third controller; and a comparator for comparing the output from said accumulator with the average frequency of occurrence calculated by said means for calculating the average frequency of occurrence of the frequency distribution, and for generating a signal for stopping said second and third scanning circuits when the output from said accululator exceeds the average frequency of occurrence.

7. An apparatus according to claim 1, wherein said state frequenccy distribution calculating means and said gain selecting means in said control means comprises a microcomputer including: an output unit for receiving the output from said state detecting means; an arithmetic and logic unit for calculating the state frequency distribution on the basis of the input from said input unit, discriminating the external state to determine whether the road is smooth or rough, on the basis of the calculated state frequency distribution, and selecting the optimal gains corresponding to the discriminated external state; a memory for storing the optimal gains and a calculation algorithm of said arithmetic and logic unit; and an output unit for outputting a signal representing optimal gains selected by said arithmetic and logic unit.

8. An apparatus according to claim 1, wherein said state frequency distribution calculating means comprises: cumulative frequency distribution calculating means for accumulating previous frequency distributions obtained for a given period of time ahead of the current time, the given period of time bring required for learning a change in the external state; and determining means for calculating an average level of the cumulative frequency distribution, comparing a deviation of the calculated average level value with a preset value serving as a reference to determine the external state.

* * * * *